Figure 2:
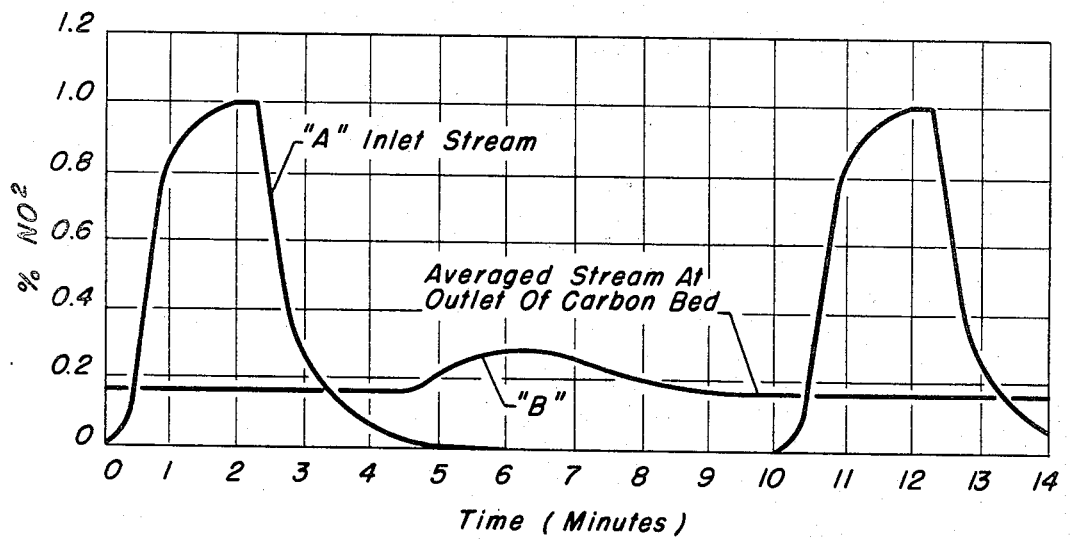

United States Patent Office 3,402,015
Patented Sept. 17, 1968

3,402,015
MULTIPLE STAGE TREATMENT OF A NOXIOUS STREAM WITH CYCLIC HIGH QUANTITIES OF NITROGEN OXIDES
Leslie C. Hardison and James M. Barr, Bloomer, Wis., assignors to Universal Oil Products Company, Des Plaines, Ill., a corporation of Delaware
Filed Oct. 14, 1965, Ser. No. 496,115
8 Claims. (Cl. 23—2)

This invention relates to a method for treating a noxious discharge stream with cyclic high quantities of nitrogen oxides. More particularly, the invention is directed to a multiple stage operation using a nitrogen oxides adsorption bed in combination with a catalytic decomposition zone whereby there will be an "averaged" nitrogen flow to the decomposition section for enhancing conversion for reduction of nitrogen oxides so as to in turn permit the discharge of a substantially non-noxious treated stream.

In the operation of units carrying out the catalytic conversion of nitrogen dioxide containing streams, in particular, it has been found that concentrations of nitrogen dioxide which are greater than about 0.6 mole percent will not be satisfactorily reduced and there is a tendency to deactivate the catalyst. For discharge streams having a continuous high concentration of nitrogen dioxide, there can be a suitable dilution of such stream and a catalytic conversion unit thus built to accommodate a predetermined increased volume of gaseous material. On the other hand, where there are periodic or cyclic high concentrations of nitrogen dioxide in a particular discharge stream, then it is uneconomical to build a unit to handle the periodic peak loads because of high construction costs and excessive operating expenses to handle the dilution air along with the noxious stream. As a means for obviating the dilution scheme and, at the same time, providing a more economical and improved procedure for handling a cyclic discharge of noxious gas, the present invention makes use of an adsorption bed in a combined type treating unit. The adsorption bed is provided in proper quantity or proportion to effect the reduction of the maximum nitrogen oxides concentrations by merely adsorbing a controlled portion of the oxides during the periods of maximum release into the discharge stream and then subsequently permitting desorption by maintaining a continuous uni-directional flow of the discharge stream for the periods when the nitrogen oxides emissions or concentrations are low.

Specifically, it may be considered a principal object of the present invention to integrate an activated carbon bed, or other suitable material for adsorption of nitrogen oxides, in a multiple stage unit and at a position upstream of a catalytic decomposition setcion to in turn provide for the passage of a controlled or "averaged" nitrogen dioxide content with the discharge stream into a catalytic unit, whereby there may be reduction of the objectionable nitrogen oxides, such as nitrogen dioxide ($NO_2$) into the less objectionable nitrogen oxide (NO) or into nitrogen, carbon dioxide and water.

Actually, various reduction operations or decomposition conditions may be provided to eliminate the obnoxious fumes and the brown plume which occurs with the presence of nitrogen dioxide. Preferably, a catalyst is utilized to enhance or accelerate the decomposition of the nitrogen oxides. For example, an oxidation catalyst in the presence of a hydrocarbon fuel will permit a substantially complete, relatively low temperature elimination of nitrogen dioxide in the discharge stream by effecting a combination of the nitrogen dioxide and hydrocarbon, in the presence of air to form water, carbon dioxide, nitric oxide and nitrogens, all of which are odorless, color free and with the exception of nitric oxide, harmless gases. The latter is toxic to a lesser degree than nitrogen dioxide. The platinum group metal oxidation catalysts are the most advantageous for this type of reaction because of their ability to permit the reaction to take place at relatively low temperature ranges, as for example for the 450° to 600° F. temperature range using hydrogen gas as a fuel or the 1000° to 1200° F. range using natural gas as a fuel.

The reactant fuel, or "sparge gas" may comprise a readily available commercial gas such as methane, propane, etc., or alternatively, a reducing gas such as hydrogen or carbon monoxide. Of course, where the fume stream is deficient of any air or oxygen, then it may be necessary to add air into the discharge stream being treated such that there will be substantially complete removal of the nitrogen oxides by combustion of the fuel along with simultaneous reduction of nitrogen oxides.

Various types of platinum group catalysts may be utilized to advantage, including the impregnated porous support materials or the various types of coated all metal base materials. Preferably, the oxidation catalyst is of the all metal type where a mat-like unit of crimped alloy ribbon is coated with a noble metal, particularly a platinum group metal. For example, one desirable form of catalytic fume decomposing catalyst may comprise an all metal type of unit such as described within United States Patent No. 2,658,742, issued to H. R. Sutter et al.

In one embodiment, the present invention provides a catalyst for treating a noxious discharge stream having a cyclic high quantity of nitrogen dioxide content therein to eliminate air pollution, which comprises, passing such stream prior to any catalytic decomposition into contact with a bed of a nitrogen dioxide adsorption material provided in an amount effecting the controlled adsorption of a fractional portion of the nitrogen dioxide content released during periods of maximum concentrations of the latter in such stream, maintaining the continued flow of the discharge stream through the adsorption bed and thus providing for nitrogen dioxide release and desorption from the bed during periods of low nitrogen oxides concentrations, and subsequently passing the thusly contacted stream with a resulting averaged nitrogen dioxide concentration into contact with at least one stage of oxidizing catalyst in the presence of an added reducing fuel, whereby to provide for the discharge of a non-noxious treated stream.

In the present operation, it is necessary that the quantity of adsorption material, which may be activated carbon or other suitable nitrogen dioxide adsorptive material, shall be supplied in a quantity or in a particular thickness which will effect a reduction in the concentration of nitrogen dioxide in the discharge stream to a level below about 0.5 to 0.6 mole percent, or even lower, depending upon what may be harmful to the particular decomposition catalyst utilized in the second stage catalyst zone. For example, if the amount of nitrogen dioxide continuously leaving the adsorption zone during the periods of maximum concentration flow is above about 0.6 mole percent and there is a resulting deactivation of the decomposition catalyst, then such adsorption bed shall be made thicker or provided with a design which adsorbs a still greater portion of the nitrogen oxides so as to bring the level of the latter down to the order of say, 0.6 mole percent or 0.5 mole percent such that the resulting continued flow through the subsequent catalyst unit will not harm the catalyst coating over a continued period of time.

Reference to the accompanying drawing and the following description thereof will serve to further amplify and clarify the present treating system for cyclic high concentrations of nitrogen oxides in a discharge stream.

Figure 1:
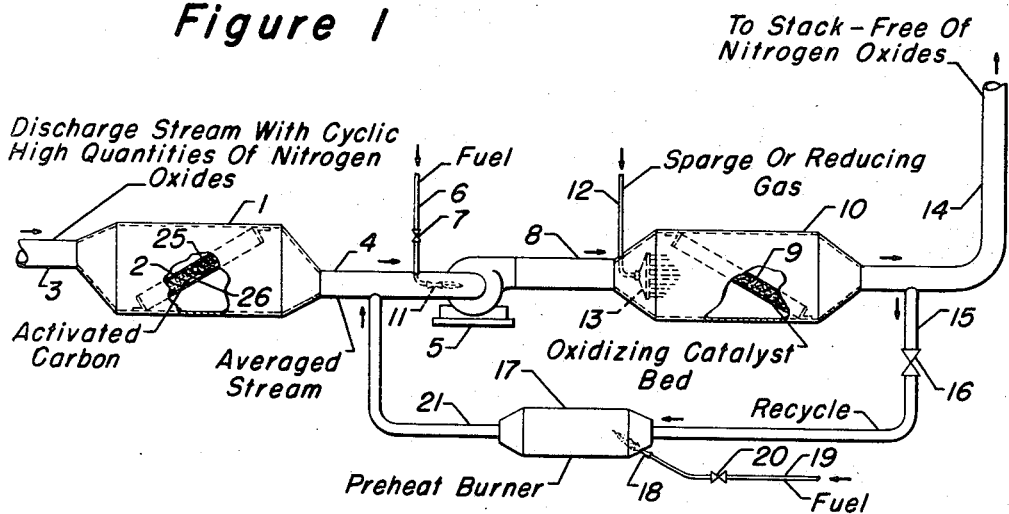

FIGURE 1 of the drawing is a diagrammatic processing scheme showing the multiple stage adsorption-decomposition treatment for a noxious stream.

FIGURE 2 of the drawing indicates plotted curves A and B, showing nitrogen dioxide content, respectively, for an inlet stream to an active adsorption zone and for a discharge stream leaving the adsorption zone.

Referring now particularly to FIGURE 1 of the drawing, there is shown an adsorption zone 1 having an internal transverse sorption bed of particulated material arranged to effect the contact of a discharge stream being introduced by way of inlet line 3 and being discharged by way of outlet conduit 4. The adsorptive material 2 may comprise activated carbon, or other suitable material for the sorption of nitrogen oxides from a gaseous stream and such material may, for example, be held between suitable screens or perforate plates 25 and 26 within the housing 1. In accordance with the present invention, the quantity of activated carbon or other adsorptive material shall be supplied in an amount or in a predetermined thickness of bed, such that the discharge stream with the cyclic high quantities of nitrogen oxides will have the latter reduced to a predetermined low level upon leaving the downstream side of the sorption bed and entering the transfer conduit 4. For example, where the noxious discharge stream contains a high concentration of nitrogen dioxide and the decomposition catalyst to be used is of a high quality platinum coating on an all metal alloy screen, the content of nitrogen dioxide shall be adsorbed and/or released to provide a maximum average of about 0.5 mole percent within the stream undergoing catalytic decomposition.

With reference to FIGURE 2 of the drawing, there is shown, in one illustrative curve A, a plotting of a discharge stream having periodic amounts of an approximate 1.0 mole percent nitrogen dioxide therein. The stream is in a steady state pattern with a velocity of about 35 feet per minute and having approximately 2 minutes of the 1.0 mole percent $NO_2$ concentration and 8 minutes of no nitrogen dioxide. With variations in depth of activated carbon bed being utilized to adsorb nitrogen oxides from the stream, there will be accompanying variations in the amount of sorption and desorption for a particular cyclic flow. However, with reference to curve B in the drawing, there is shown an "averaged" stream which will occur at the outlet end of the bed when using a 7″ thickness of activated carbon to accommodate a stream as shown in line A. Where curve A has less sharp peaks because of longer periods of high nitrogen dioxide content in the stream, or where the concentration is for a higher portion of the time cycle, then the adsorptive-desorption effect will be lessened and the curve B will be less flat or less of a uniform "averaged" reduced content.

Referring again to the multiple stage operation of FIGURE 1, there is shown the "averaged" discharge stream passing by way of line 4 into a blower 5 after suitable preheating by burner means 11 being supplied fuel by way of line 6 and control valve 7. The heated nitrogen oxides stream leaves the blower 5 by way of conduit 8 which in turn feeds the stream into contact with a suitable oxidizing catalyst bed 9 maintained within a housing 10. At the end of conduit 8 or ahead of the catalyst bed 9 a suitable sparge gas or reducing medium is introduced into admixture with the heated discharge stream from line 12 and distributor means 13. The amount of sparge gas in the total volume will be small, but of course shall be of an amount equal to or slightly greater than that required to react with the amount of nitrogen oxides in the discharge stream.

In accordance with the present multi-stage operation, the decomposition-reduction reaction for the nitrogen dioxide takes place in the presence of a suitable oxidizing catalyst 9 which, for example, may comprise the all metal form of catalyst mat as hereinbefore described in connection with United States Patent No. 2,658,742. The overall result of the reaction is the decomposition of the fuel stream and the reduction of the nitrogen dioxide stream so as to form the harmless gaseous products of carbon dioxide, water and nitrogen. There will of course be some temperature rise through the catalyst bed in view of the oxidation reaction taking place. The resulting high temperature stream from catalyst 9 in zone 10 is discharged by way of line 14 to a stack or discharge means.

The processing scheme of FIGURE 1 shows that there may also be a recycle of a part of the hot treated gaseous stream leaving line 14 by transferring at least a portion of such stream through line 15, having control valve 16, into a preheat section 17. The latter may be used for start-up purposes or for the reduction of heat input into the bed from a burner 11. The preheat section has burner 18 receiving fuel by way of line 19 and control valve 20. The preheating recycle stream from line 15 may then pass from section 17 by way of line 21 into admixture with the discharge stream of conduit 4 which in turn communicates with blower 5 in the inlet end of the catalytic decomposition bed 9.

The diagrammatic schematic of FIGURE 1 indicates a single stage oxides adsorption section and a single catalytic bed or conversion section; however, where desirable, there may, of course, be two or more stages for each of the adsorption and catalytic sections to insure that the nitrogen dioxide content is not excessive for the stream entering the catalyst section, and thus insure that there is a substantially complete reduction of the noxious fumes in the stream being discharged to the atmosphere or being reused in a process system.

By way of illustration, a unit arranged schematically in the manner similar to that shown in FIGURE 1 and handling the discharge stream of air which is the order of 600 standard cubic feet per minute, with an $NO_2$ content having peaks of the order of about 2.2 mole percent, is subjected to an initial contact with activated carbon in a bed of approximately 2½″ of thickness to provide an averaged concentration which varies from about 0.1 mole percent to about 0.7 mole percent. The bed area is sized to provide that the stream velocity is maintained in the 20 to 100 foot per minute range. The resulting averaged stream with the 0.7 mole percent may then be charged in admixture with propane, in an amount to provide about 1.5% in the stream, and at a temperature of about 550° F. through a catalytic zone containing a platinum coated alloy mat arrangement of about 2″ thickness, with such a catalyst mat normally having a high ability to decompose or incinerate noxious volatile components. However, in this instance the catalyst is unsatisfactory to effect sufficiently complete reduction of the nitrogen dioxide content inasmuch as there is a substantial brown plume periodically emanating from the unit downstream of the catalyst zone.

On the other hand, in an improved operation, where the aforedescribed arrangement utilizes a thicker carbon bed of the order of 4″ such that there is a reduction in the concentration of nitrogen dioxide from the maximum 2.2 mole percent to the order of 0.5 mole percent maximum in an average adsorption-desorption stream, then the catalyst section is able to effect a decomposition and reduction of the $NO_2$ without any brown plume showing. Generally, a suitable catalyst unit will adequately handle the 0.5 mole percent as a maximum concentration over an extended period of time without there being any visible nitrogen dioxide showing from the catalytically treated stream.

It may be pointed out that in effecting reduction operations in the manner just described that other reducing streams or sparge gases may be utilized in lieu of the propane. For example, hydrogen or carbon monoxide may be introduced into admixture with the $NO_2$ containing stream ahead of the catalyst section and used effectively. Also, as an alternative, there may be the use of natural gas as a sparge fuel; however, in this instance, there shall be a preheat temperature of the order of 1000° F. to 1200° F. rather than the lower temperature range recited.

We claim as our invention:

1. A method for treating a noxious discharge stream having a cyclic high quantity of nitrogen oxides content therein to eliminate air pollution, which comprises, passing such stream prior to any catalystic decomposition into contact with a bed of nitrogen oxides adsorption material provided in an amount effecting controlled adsorption of a major portion of the nitrogen oxides content released during periods of maximum nitrogen oxides concentrations in such stream, maintaining continued flow of said discharge stream through the adsorption bed and providing for nitrogen oxides release and desorption from the bed during periods of low nitrogen oxides concentrations, and subsequently continuously passing the thusly contacted stream with a resulting averaged nitrogen oxides concentration substantially less than said maximum nitrogen oxides concentrations into contact with at least one stage of oxidizing catalyst in the presence of an aded reducing fuel, whereby to discharge a non-noxious treated stream.

2. The method of claim 1 further characterized in that said adsorption material comprises subdivided activated carbon held in a relatively thin porous bed whereby the discharge stream may pass directly therethrough during the adsorption contact.

3. The method of claim 1 further characterized in that said oxidizing catalyst is an all metal catalyst formed by having a platinum group metal coated on an alloy metal ribbon form of base.

4. The method of claim 1 further characterized in that said reducing fuel is a normally gaseous hydrocarbon.

5. The method of claim 1 further characterized in that said reducing fuel is hydrogen.

6. The method of claim 1 further characterized in that said reducing fuel is carbon monoxide.

7. A method for treating a noxious discharge stream cyclicly containing a quantity of nitrogen dioxide greater than about 0.6 mole percent without adding a dilution gas, which comprises, continuously passing such stream into a first stage contact with an adsorption bed of activated carbon provided in an amount effecting a controlled adsorption of nitrogen dioxide and to reduce the content thereof being released downstream of the adsorption bed during periods of maximum concentrations, maintaining a continued flow of said discharge stream through said adsorption bed during periods of low nitrogen dioxide content therein and thusly permitting desorption of nitrogen dioxide from the bed, and passing a resulting stream from the latter with an averaged nitrogen dioxide concentration therein of less than 0.6 mole percent into contact with at least one subsequent stage of contact with an oxidation catalyst at decomposition conditions and in the presence of an added reducing stream, whereby to provide a treated non-noxious discharge stream.

8. The method of claim 7 further characterized in that said oxidizing catalyst is an all metal catalyst formed by having a platinum group metal coated on an alloy metal ribbon form of base.

References Cited

UNITED STATES PATENTS

| | | | |
|---|---|---|---|
| 2,992,895 | 7/1961 | Feustel et al. | 23—2 X |
| 3,032,387 | 5/1962 | Anderson et al. | 23—2 |
| 3,125,408 | 3/1964 | Childers et al. | 23—2 |

OSCAR R. VERTIZ, *Primary Examiner.*

E. C. THOMAS, *Assistant Examiner.*